(12) United States Patent
Eftekharzadeh

(10) Patent No.: US 11,603,652 B2
(45) Date of Patent: Mar. 14, 2023

(54) STORM TUNNEL

(71) Applicant: Shahriar Eftekharzadeh, Torrance, CA (US)

(72) Inventor: Shahriar Eftekharzadeh, Torrance, CA (US)

(*) Notice: Subject to any disclaimer, the term of this patent is extended or adjusted under 35 U.S.C. 154(b) by 0 days.

(21) Appl. No.: 17/194,170

(22) Filed: Mar. 5, 2021

(65) Prior Publication Data

US 2021/0189710 A1 Jun. 24, 2021

(51) Int. Cl.
*E03F 1/00* (2006.01)
*B65G 5/00* (2006.01)

(52) U.S. Cl.
CPC ............... *E03F 1/002* (2013.01); *B65G 5/00* (2013.01)

(58) Field of Classification Search
CPC . E03F 1/002; B65G 5/00; E02B 11/00; E02B 11/005
See application file for complete search history.

(56) References Cited

U.S. PATENT DOCUMENTS

| 5,249,885 | A | * | 10/1993 | Florence | E03F 1/002 405/38 |
|---|---|---|---|---|---|
| 2005/0100410 | A1 | * | 5/2005 | Maestro | E03F 1/003 405/49 |
| 2011/0052321 | A1 | * | 3/2011 | Tsai | E02B 11/005 405/43 |
| 2013/0071189 | A1 | * | 3/2013 | Aston | E01F 5/005 405/126 |
| 2014/0105684 | A1 | * | 4/2014 | Allard | E01F 5/005 405/52 |
| 2017/0321397 | A1 | * | 11/2017 | Kent | E03B 11/14 |
| 2018/0030712 | A1 | * | 2/2018 | Kent | E03F 1/005 |

FOREIGN PATENT DOCUMENTS

| CN | 208701845 | * | 4/2019 |
|---|---|---|---|
| FR | 2900944 | * | 11/2007 |

* cited by examiner

*Primary Examiner* — Carib A Oquendo

(57) ABSTRACT

A tunnel for detention, infiltration, and retention of water.

4 Claims, 30 Drawing Sheets

STORM TUNNEL

FIELD OF THE INVENTION

The present invention is in the field of devices for management of stormwater runoff. More specifically, the present invention relates to capture, detention, infiltration, and retention of stormwater.

BACKGROUND OF THE INVENTION

Recent environmental needs and regulations are mandating the capture, detention, and infiltration of stormwater runoff from entire urban watersheds to prevent pollution and to replenish groundwater. This has become an imperative driven by water scarcity and regulations to prevent and mitigate pollution. Furthermore, there is a drive towards developing local water resources, which requires retention of stormwater runoff for later use. The volume of the stormwater runoff involved is often very large requiring large plots of land for the required facilities. This is hard to find in most urban areas.

The current stormwater Best Management Practice (BMP) of choice for detention-infiltration is infiltration galleries, while cisterns of various shapes and sizes are used for stormwater retention Infiltration galleries are large underground structures with permeable beds constructed by surface excavations of large plots of land, to which stormwater runoff is diverted following pretreatment, for detention and gradual infiltration. Cisterns are similar size structures without permeable beds Infiltration galleries and cisterns are typically sited in public parks and large open parking lots where the extensive area of land required is available. However, the need for suitable sites for infiltration galleries and cisterns in congested urban area dwarfs availability.

Therefore, there is a need for a simple and practical apparatus for large-volume detention-infiltration-retention of stormwater runoff in urban areas.

SUMMARY OF THE INVENTION

The present invention provides an apparatus for the above need in the form of an underground tunnel with improved features that enable large-volume detention-infiltration-retention of stormwater runoff. Tunnels have long been used in urban areas for public transportation, water conveyance, and as utility conduits. Tunnels have also been used for storage of overflow from combined sewers resulting from inadequate hydraulic capacity during storm events. Therefore, tunnels may already be used for stormwater runoff detention and retention in urban areas without much improvements. Tunnels bring utility to the underground space below congested surface areas where availability of land is the main constraint. However, tunnels in their current form, cannot be used for infiltration, which is a key requirement for utility as a stormwater BMP.

For the purpose of the present invention, tunnels are horizontally bored or excavated voids of substantially prismatic cross section form lined with a structural liner to withstand external forces. The liner is either in the form of whole segments of the entire tunnel cross section, as in the case of microtunneling, or as fractional segments of the tunnel cross section assembled together inside the bored excavation as part of the tunneling operation, as in the case of large tunnels constructed by tunnel boring machines.

Infiltration drywells are a well-recognized stormwater BMP. They are vertical drilled shafts filled with granular material such as crushed stone or gravel, disposed to receive runoff and percolate it through to cause infiltration into the ground formation. However, the detention volume of drywells is limited to the volume of voids within and thus very small. Therefore, capacity of drywells to receive stormwater is practically limited to their infiltration capacity such that each drywell suffices only for a small catchment area.

The present invention is a conventional tunnel with improved features that make it capable of infiltration, detention, and retention of stormwater. As such, it is a multi-purpose stormwater BMP for urban areas. In one embodiment of the present invention, either a portion of the tunnel cross section perimeter symmetrical about the invert, or the entire tunnel perimeter, is fitted with perforations that establish hydraulic communication between the tunnel interior and the ground formation on the exterior to result in infiltration. This provides the tunnel with certain infiltration capacity that depends on the length of the tunnel, the wetted perimeter infiltrating, and the hydraulic conductivity of the ground formation.

Diverted stormwater runoff in excess of tunnel infiltration capacity accumulates in the tunnel and is thus detained. Detention is reversed once the diversion rate decreases to below the infiltration capacity, at which time the water detained begins to infiltrate until there is no water left in the tunnel. In this embodiment, the tunnel is suitable to serve as a detention-infiltration BMP, and the only improvements made to the tunnel is the use of perforated tunnel segments with specified perforation sizes and extent of coverage, used in lieu of solid segments in conventional tunnels.

In another embodiment, the infiltration capacity of the tunnel is enhanced by fitting it with infiltration drywells with inlets or connecting lateral conduits flush with the tunnel invert in direct hydraulic communication with the water inside the tunnel. This may be accomplished by constructing the tunnel using certain segments fitted with vertically aligned portals, one on the tunnel soffit and the other on the invert, to accommodate the surface drilling of infiltration dry wells through the tunnel alignment centerline post construction. The portals may be removable pieces that are secured in place during tunnel construction and removed after the tunnel is constructed for the installation of the dry wells. Alternatively, the portals may be distinct areas made from materials that can easily be drilled through. In this embodiment, infiltration drywells may be used in conjunction with perforated tunnel perimeter, or without any perforations, depending on the required infiltration capacity.

In yet other embodiments, the tunnel is equipped with retention capability in addition to detention-infiltration capability. This is accomplished by either elevating the tunnel perforations a certain level above the tunnel inverts and raising the inlet level of the drywells above the tunnel invert using risers of certain height that corresponds to the retention volume required. Another possibility is to only use drywells with risers without any perforations in the tunnel perimeter.

Stormwater entering the tunnel will be retained until it reaches the level of the lowest perforations, or the sill elevation of the drywell riser, and infiltrates into the ground formation as it elevates above to result in water detention. Detained water is infiltrated via the perforations and drywells and drops down to the level of the perforations and/or the sill elevation of the drywell riser leaving retained water of volume same as the design retention volume of the tunnel less any silt deposited. For these embodiments, the tunnel is equipped with at least one sump to fit a pump for removal of the retained water and any silt deposited. In ground formations unsuitable for infiltration, either because of low impermeability of the soils, contamination, or otherwise, this embodiment of the present invention may be used without perforations in the tunnel perimeter or infiltration drywells, but with at least one sump for the removal of the retained water and any silt deposits. As such, the present invention becomes a cistern for retention of stormwater.

The configuration and sizing of the detention-infiltration-retention tunnel system of the present invention for a given design storm event is established through an optimization exercise involving the diameter and length of the tunnel, the number, dimensions, and locations of the drywells, the height of the drywell riser above tunnel invert, and the decision to also utilize perforated tunnel segments, consistent with the infiltration properties of the ground formations in the project area. The invention has many advantages over conventional infiltration galleries and cisterns, the most important of which is independence from availability of a suitable site. Other important advantages include absence of surface excavation, elimination of pumping requirement for diversion by lowering the tunnel as needed, elimination of surface construction noise, pollution, and public impact, minimized excavation, and adequate capacity to meet the needs.

It is an object of this invention to provide a stormwater BMP tunnel for detention, infiltration, and retention of stormwater runoff.

It is an object of this invention to provide improved elements and arrangements by apparatus for the purposes described thereof, which is comparable in cost with existing systems, dependable, and fully effective in accomplishing its intended purposes.

These and other objects of the present invention will become readily apparent upon further review of the following specification and drawings.

DETAILED DESCRIPTION

Figure 1:
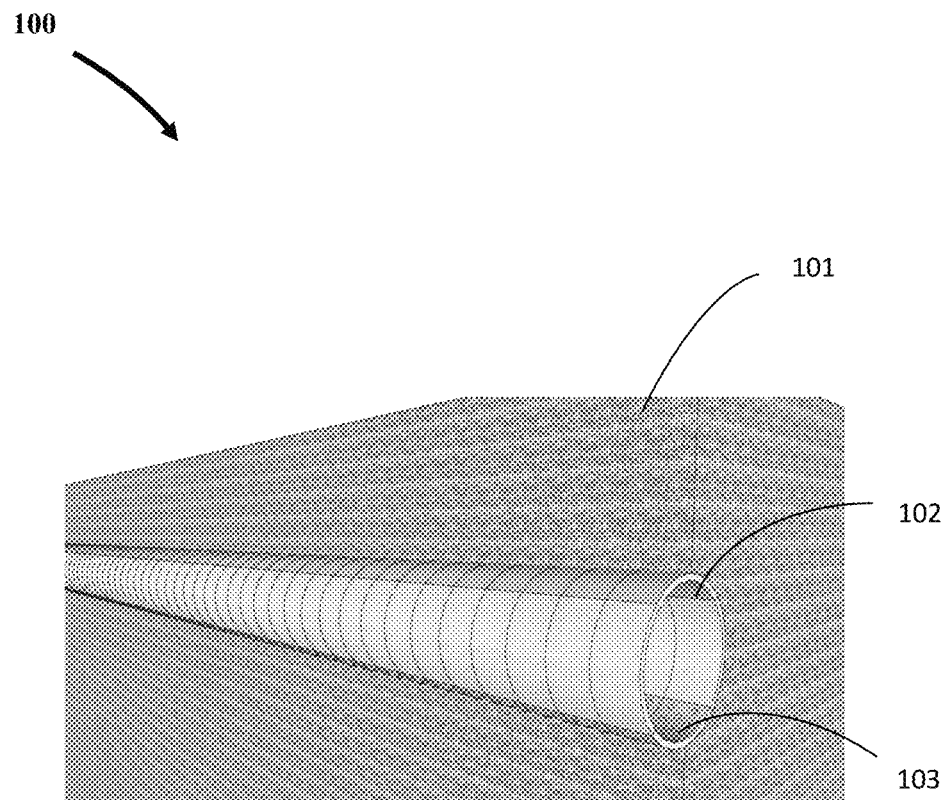
FIG. 1 is a perspective view of one embodiment of the present invention using perforated tunnel liner segments.

Referring to FIG. 1, there is shown a perspective view of one embodiment of the present invention 100 using a perforated segment 103 in the segmental tunnel liner 102.

Perforated segment 103 is disposed to establish hydraulic communication between the interior and the exterior of the tunnel liner 102 to allow water inside to infiltrate to the outside ground formation 101.

Figure 2:
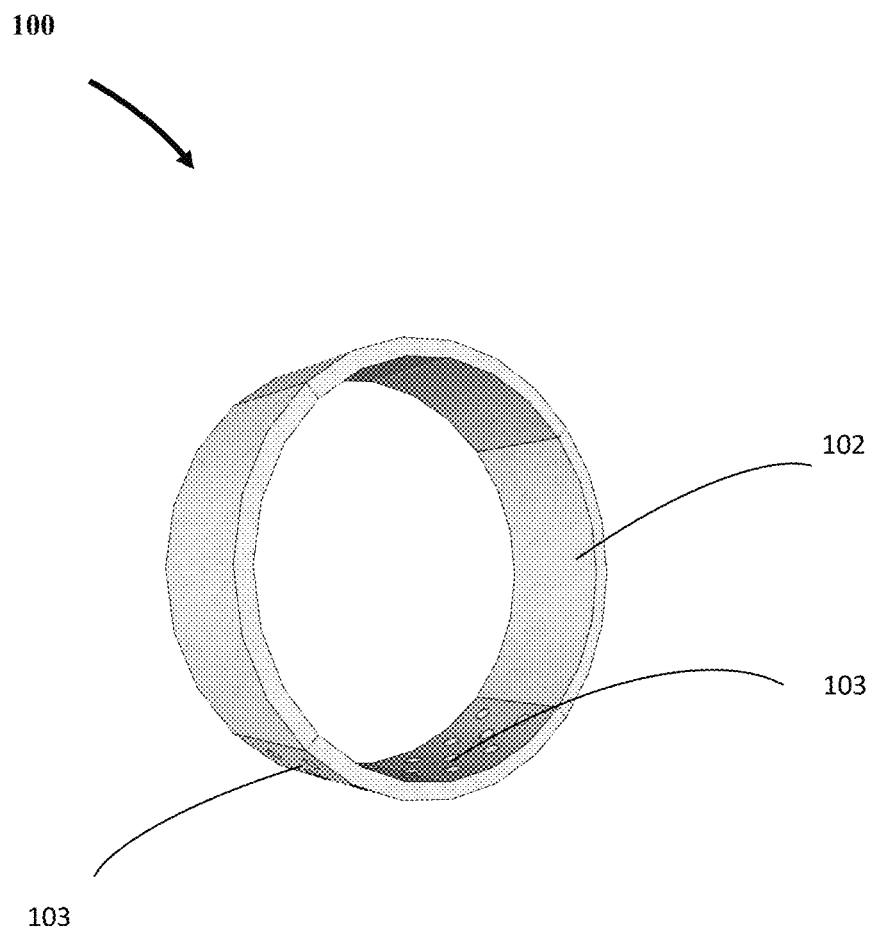
FIG. 2 shows the location of a partially perforated segment in a tunnel liner section.

FIG. 2 shows the preferred location of a perforated segment 103 in a partially perforated tunnel liner section 102, covering the lower one quarter of the liner perimeter. Other segments or portions thereof may also be fitted with perforation as deemed necessary. This configuration also holds true for non-segmental tunnel liners, such as those used in microtunneling.

Figure 3:
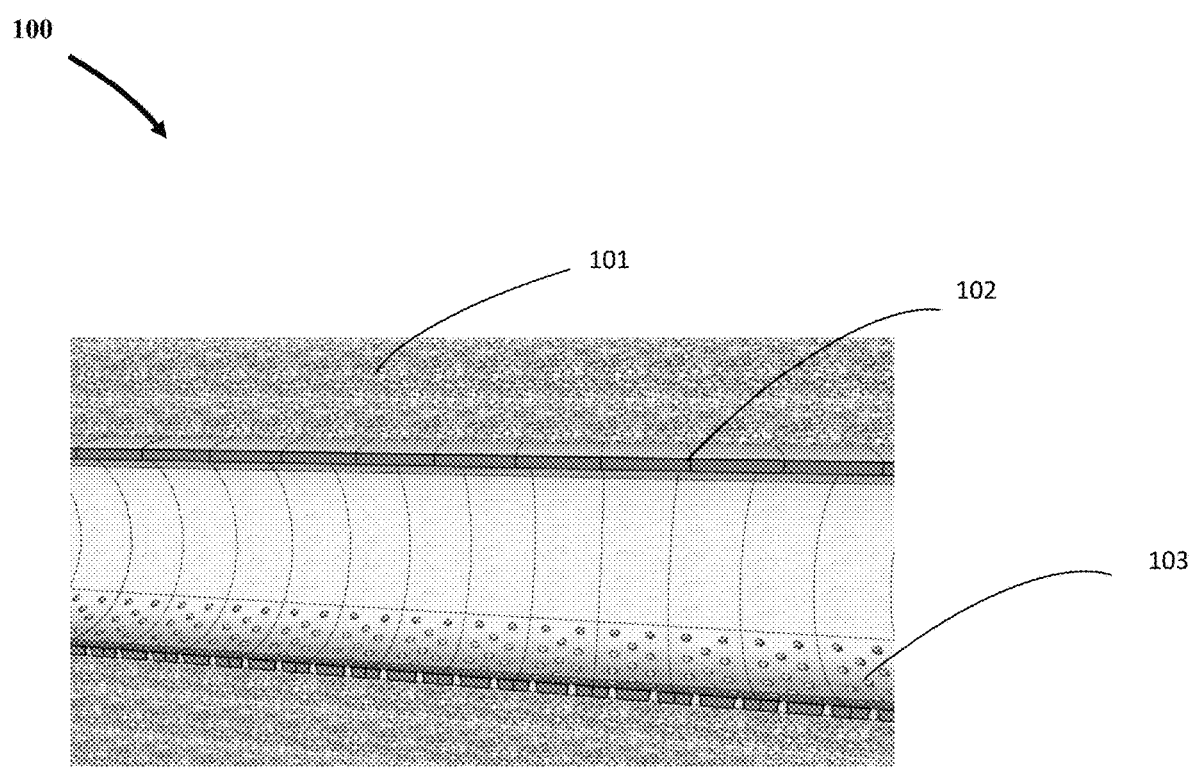
FIG. 3 is a cut longitudinal section of the embodiment of the present invention in FIG. 1.

FIG. 3 is a cut longitudinal section of the embodiment of the present invention 100 shown in FIG. 1. Perforated segments 103 along the bottom of the tunnel liner 102 form a permeable bed for water to infiltrate to ground formation 101.

Figure 4:
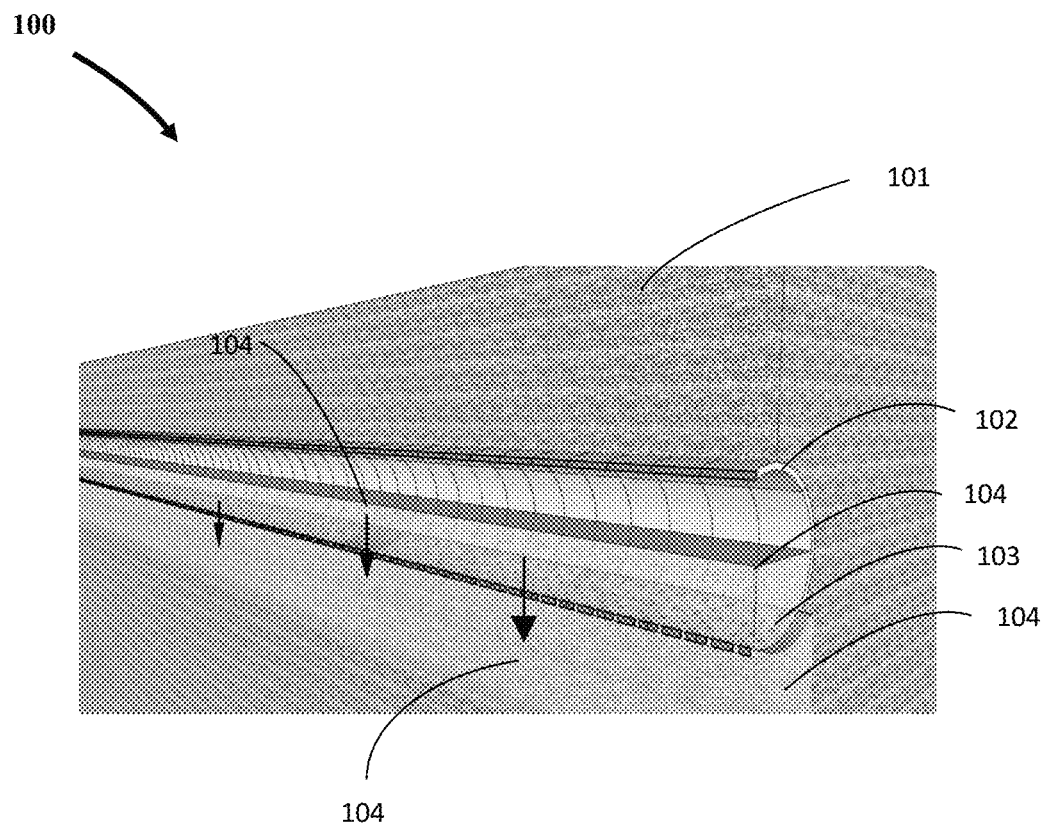
FIG. 4 is a cut longitudinal section of the embodiment of the present invention in FIG. 1 during operation showing water detention and infiltration.

FIG. 4 is a cut longitudinal section of the embodiment of the present invention 100 in FIG. 1 during operation showing water detention and infiltration. Diverted stormwater 104 infiltrates to ground formation 101 through the permeable bed created by perforated segments 103 in tunnel liner 102 while accumulating inside tunnel 100 during the times when inflow from diversion exceed outflow by infiltration.

Figure 5:
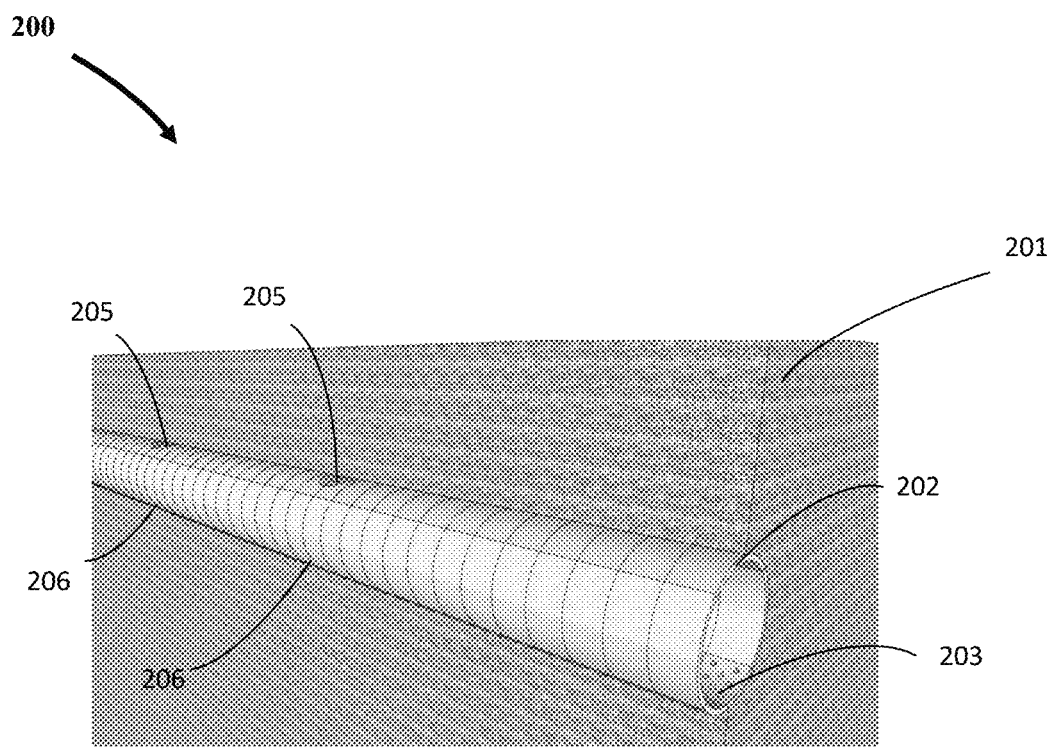
FIG. 5. is a perspective view of another embodiment of the present invention using perforated tunnel liner segments plus portals at intervals in tunnel liner segments for drywells.
Figure 6:
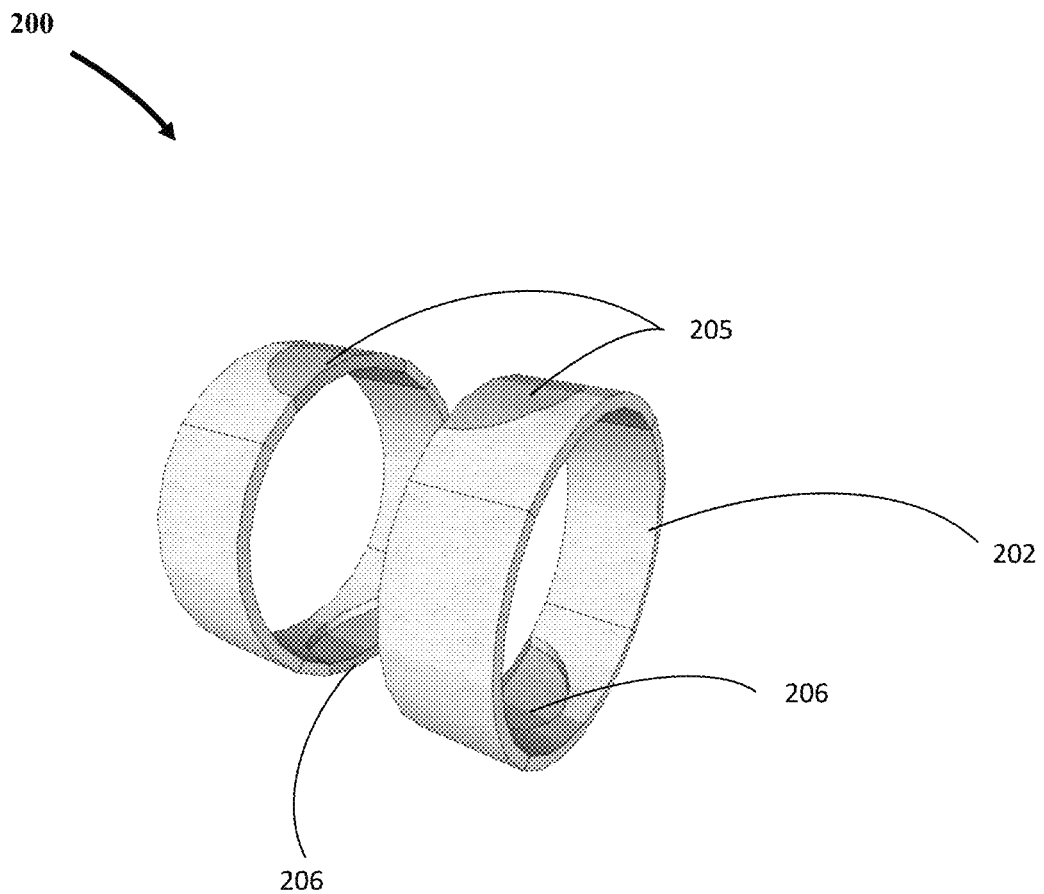
FIG. 6 shows the location and details of the portals in the embodiment of the present invention in FIG. 5.
Figure 7:
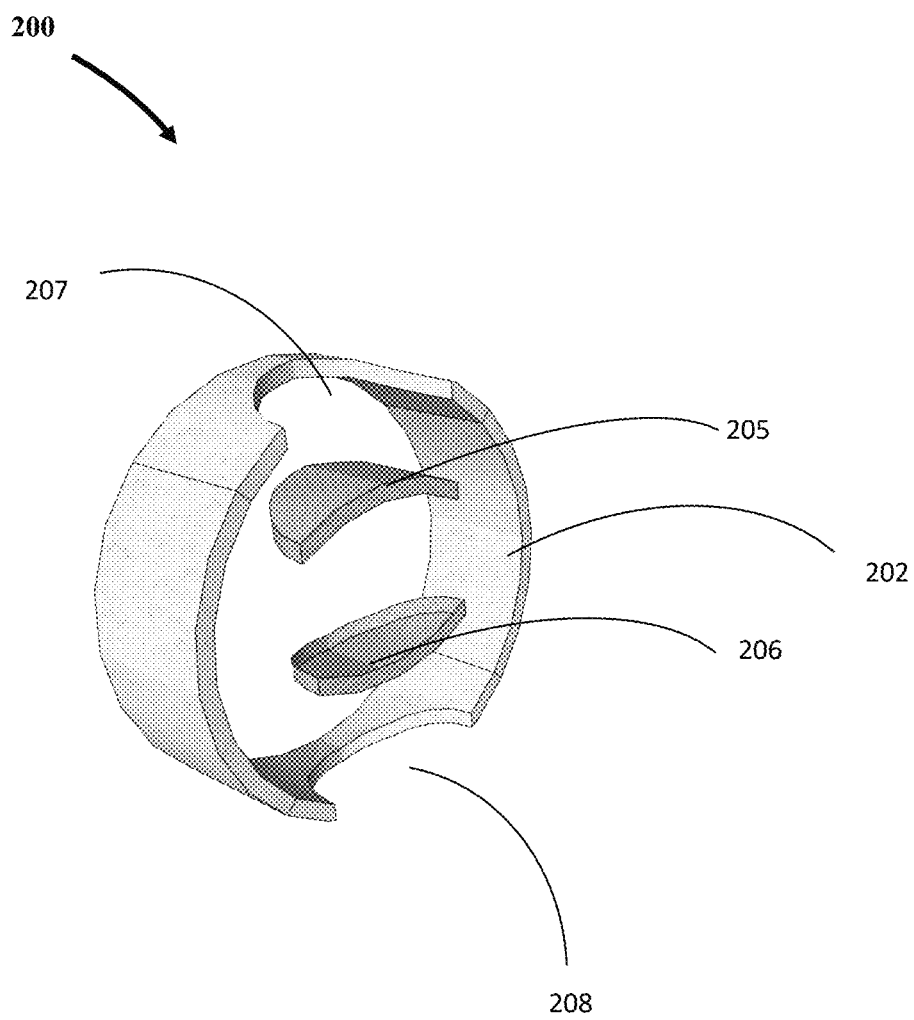
FIG. 7 shows how the portals in the embodiment of the present invention in FIG. 5 may be removed.
Figure 8:
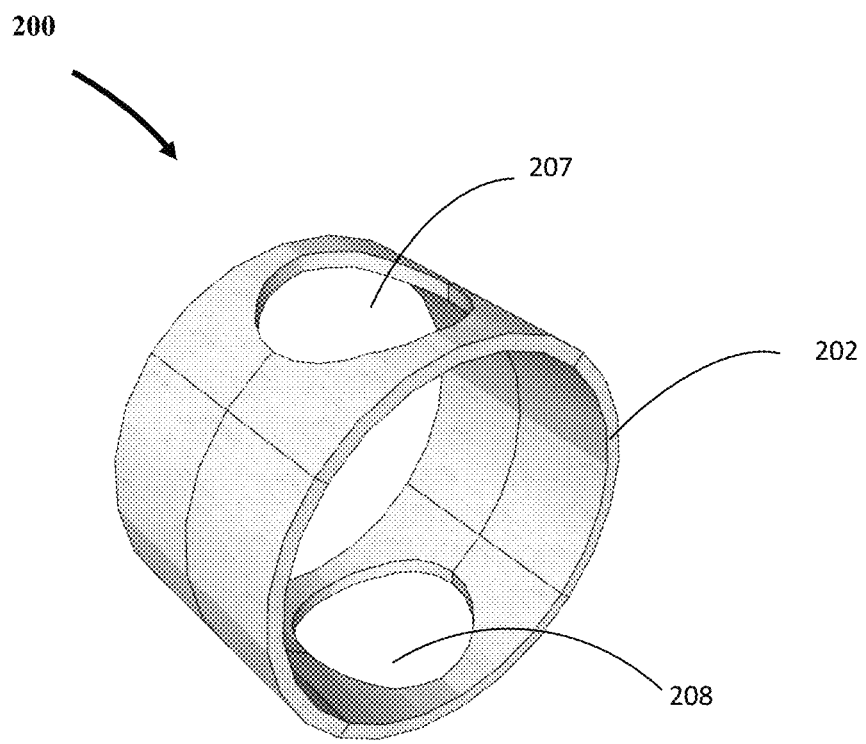
FIG. 8 shows the opening in the tunnel liner of the embodiment of the present invention in FIG. 5 with the portals removed.

FIG. 5 is a perspective view of another embodiment of the present invention 200 using perforated tunnel segments 203 in tunnel liner 202 plus portals 205, 206 at intervals in tunnel liner 202 to accommodate drywells. FIG. 6 shows vertically aligned portals 205, 206 in tunnel liner 202. FIG. 7 shows portals 205, 206 in the embodiment of the present invention 200 removed once liner 202 is installed to leave vertically aligned openings 207, 208. FIG. 8 shows the vertically aligned openings 207, 208 in the tunnel liner 202 of the embodiment of the present invention 200 in FIG. 5 with the portals removed. Vertically aligned openings 207, 208 enable the drilling of a vertical shaft through tunnel 200 and thus make possible the installation of a conventional drywell from the surface. This is a key feature of the present invention 200.

Figure 9:
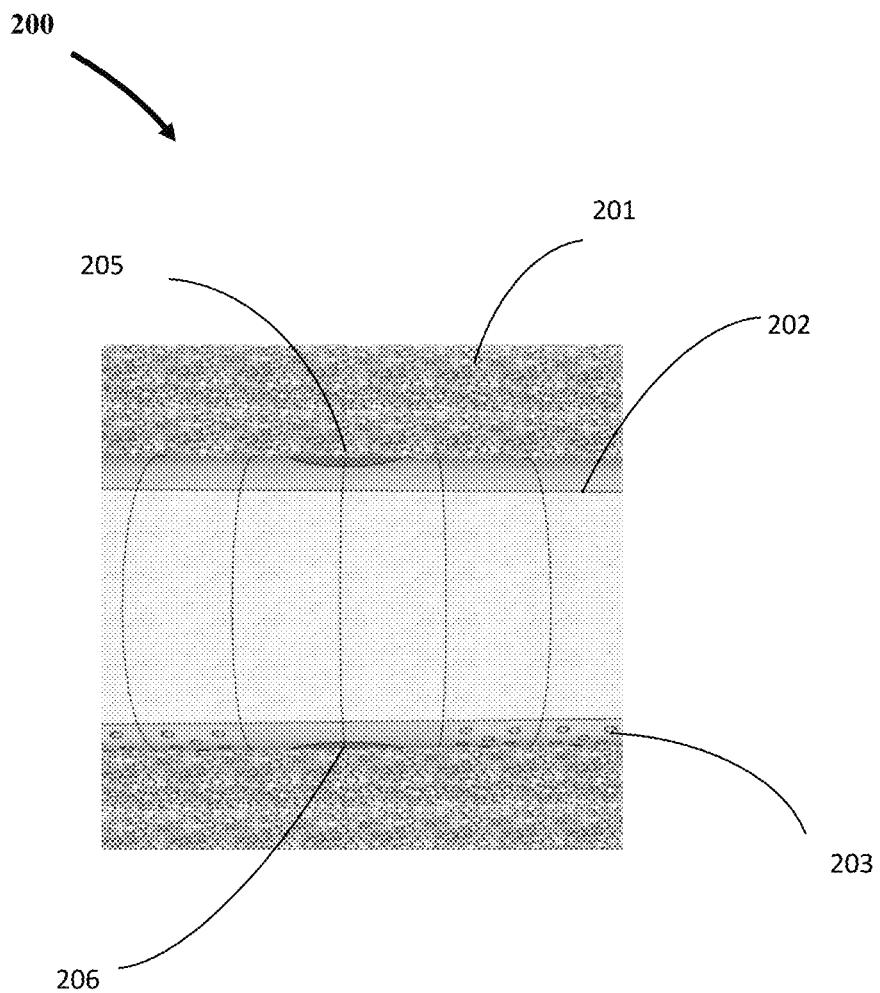
FIG. 9 is a closeup of the tunnel exterior where the portals of the embodiment of the present invention in FIG. 5 are located.
Figure 10:
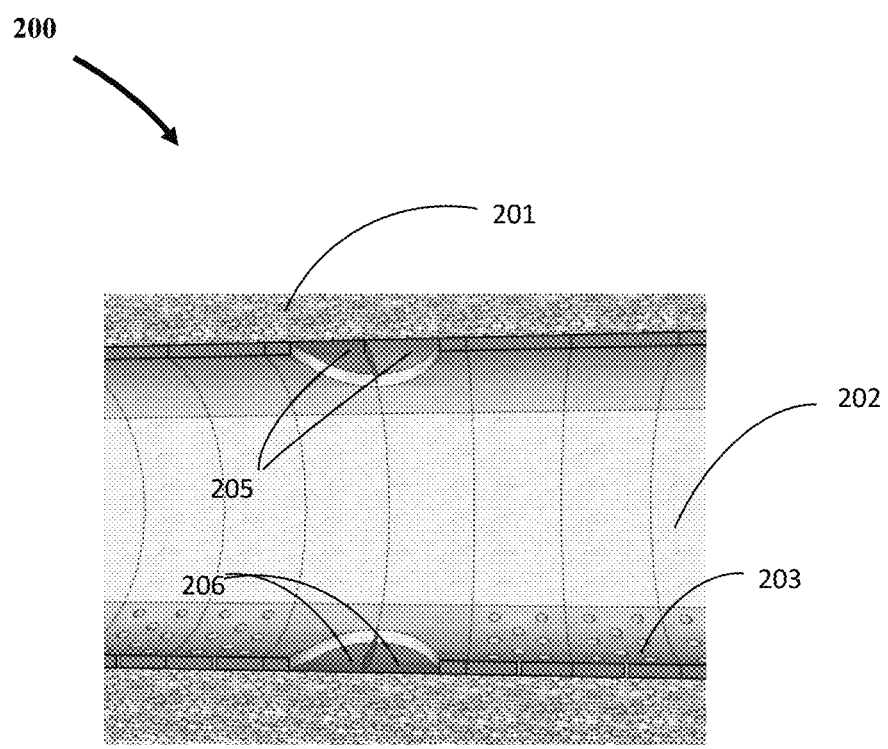
FIG. 10 is a cut longitudinal profile of the tunnel interior where the portals of the embodiment of the present invention in FIG. 5 are located.

FIG. 9 is a closeup of the exterior of the embodiment of the present invention 200 in FIG. 5 where portals 205, 206 are located. Portals 205, 206 align vertically to enable the drilling of a vertical shaft through the centerline of the tunnel 200. FIG. 10 is a cut longitudinal profile of the embodiment of the present invention 200 in FIG. 5 where portals 205, 206 are located. Portals 205, 206 are removed after installation of liner 202 to enable drilling of vertical shaft from ground surface for installation of dry well.

Figure 11:
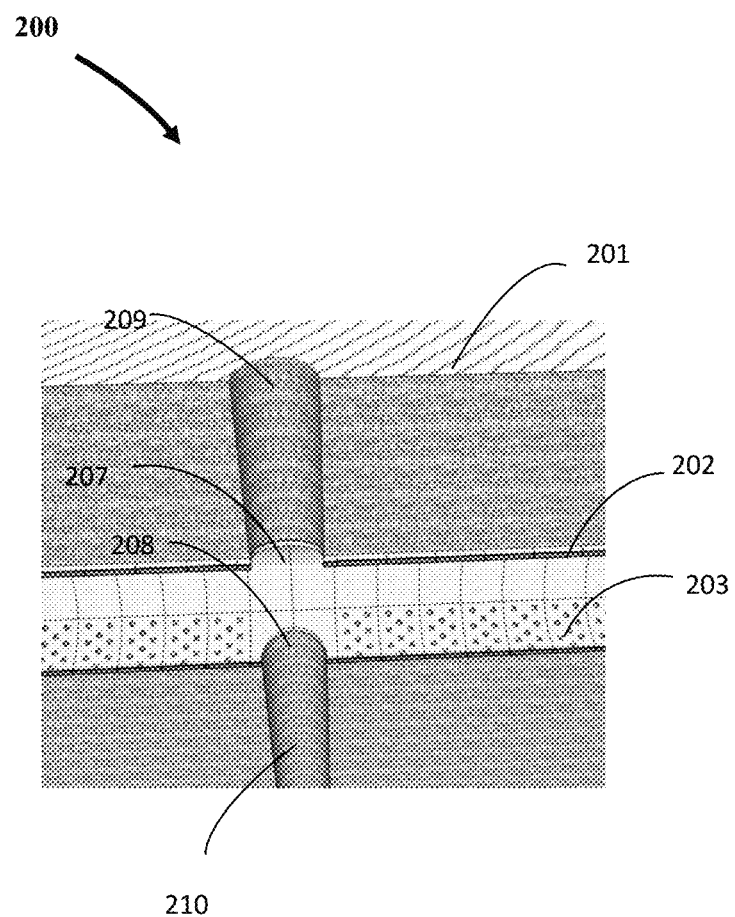
FIG. 11 is a cut longitudinal profile of the tunnel interior where the portals of the embodiment of the present invention in FIG. 5 are located with portals removed and vertical shaft for drywells excavated above and below portals.
Figure 12:
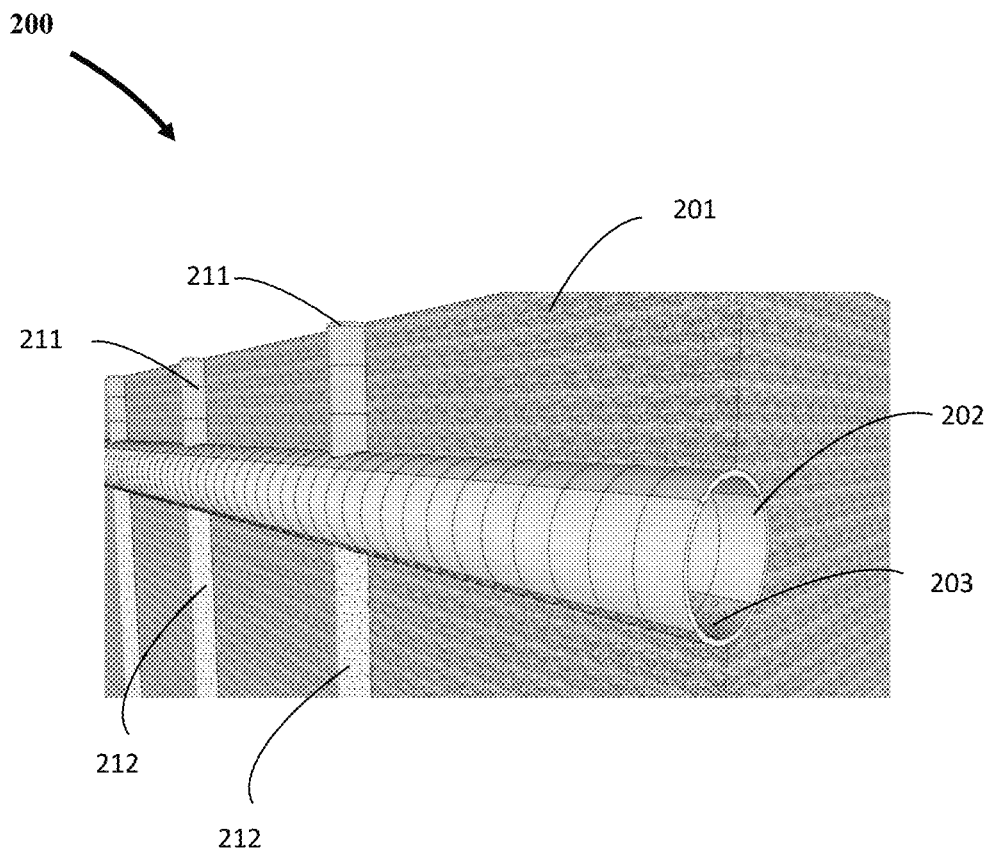
FIG. 12 is a longitudinal perspective of the embodiment of the present invention in FIG. 5 with infiltration dry wells installed on the portals along the tunnel centerline alignment.
Figure 13:
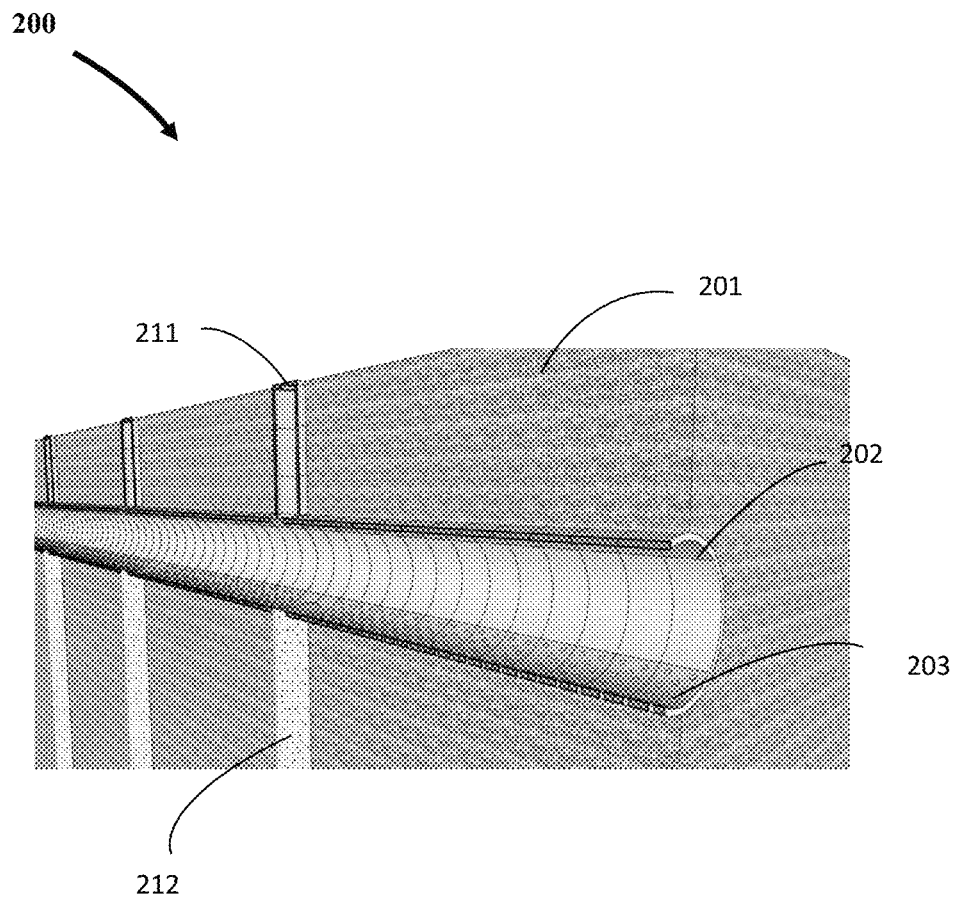
FIG. 13 is a cut longitudinal profile perspective of the embodiment of the present invention in FIG. 5 with infiltration dry wells installed along the tunnel centerline alignment.

FIG. 11 is a longitudinal perspective of the embodiment of the present invention 200 in FIG. 5 with portals removed and vertical shafts 209, 210 drilled atop and below openings 207, 208. FIG. 12 is longitudinal profile of the embodiment of the present invention 200 in FIG. 5 showing drilled shaft 209 above opening in tunnel soffit 207 in FIG. 11 lined to create access shaft 211 and drilled shaft 210 below opening in tunnel invert 208 in FIG. 11 filled with crushed stone to create infiltration dry well 212. FIG. 13 is a cut longitudinal profile of FIG. 12 showing infiltration dry wells 212 installed along tunnel centerline and their corresponding access shafts 211.

Figure 14:
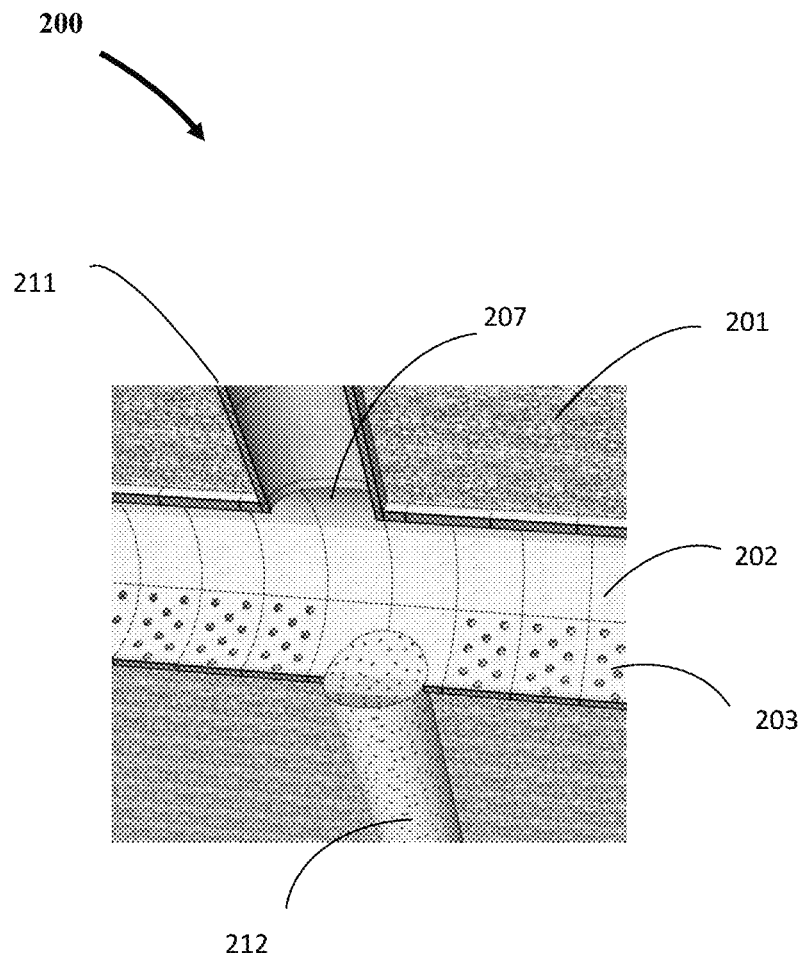
FIG. 14 is a closeup of the tunnel interior of the embodiment of the present invention in FIG. 5 where the drywells are located.

FIG. 14 is a closeup of the tunnel interior of the embodiment of the present invention 200 in FIG. 5 where the drywells 212 with their corresponding access shaft 211 are located. Opening of drywells 212 is flush with invert of tunnel 200 such that all water in tunnel 200 can enter the drywells 212 leaving tunnel 200 dry.

Figure 15:
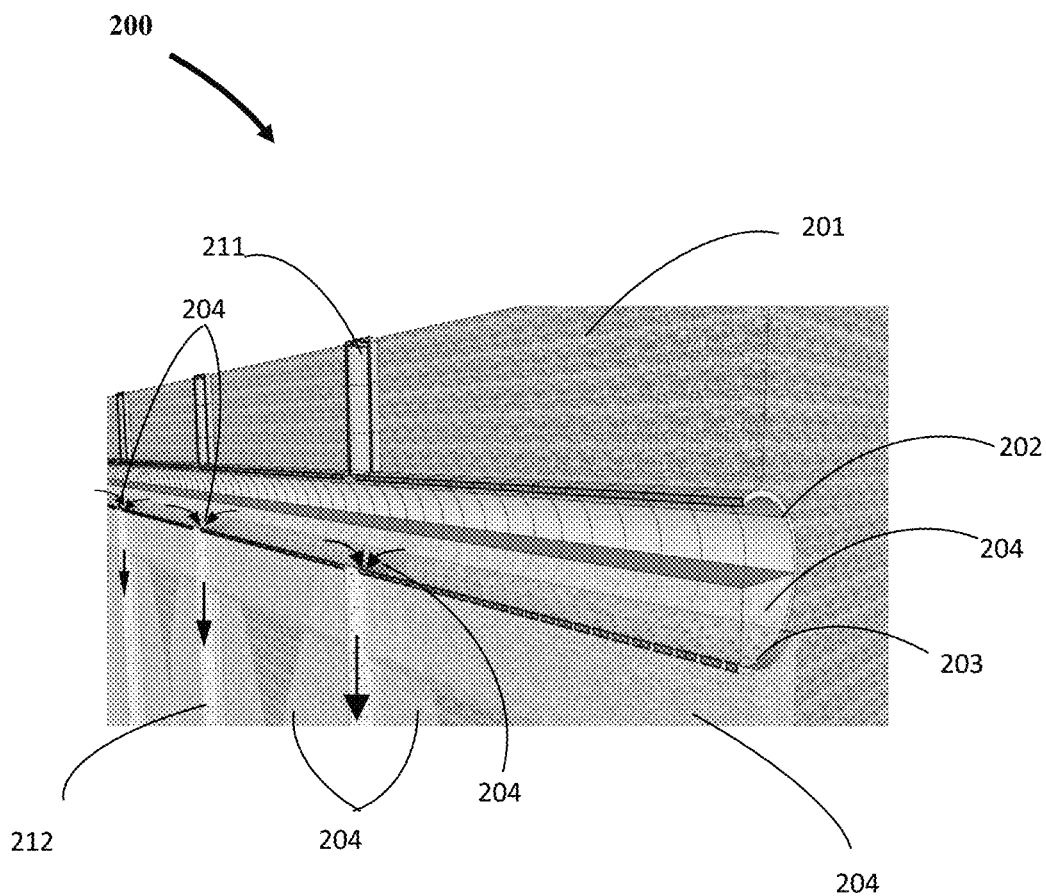
FIG. 15 is a cut longitudinal profile of the embodiment of the present invention in FIG. 5 during operation showing water detention and infiltration.

FIG. 15 is a cut longitudinal profile of the embodiment of the present invention in 200 FIG. 5 during operation showing water detention and infiltration. Diverted stormwater 204 infiltrates to ground formation 201 through both the permeable bed created by perforated segments 203 in tunnel liner 202 as well as via infiltration dry wells 212. Water 204 accumulates inside tunnel 200 during the times when inflow from diversion exceed outflow by infiltration and dissipate once inflow from diversion is less that outflow by infiltration.

Figure 16:
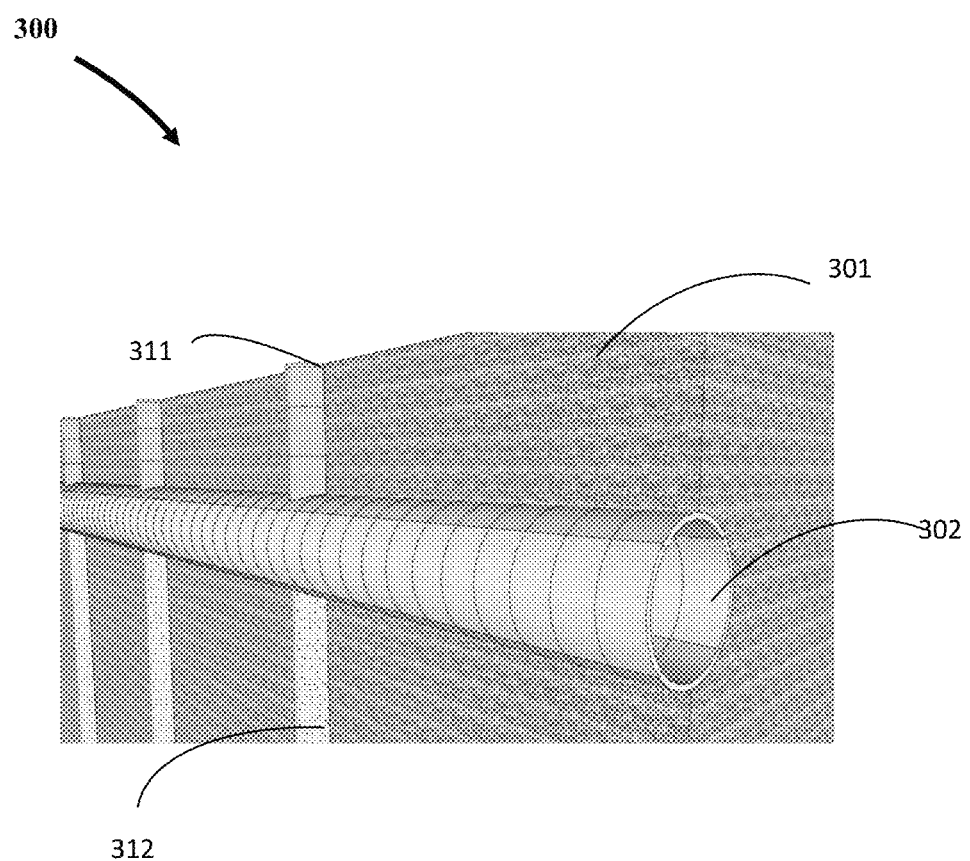
FIG. 16 is a perspective view of another embodiment of the present invention using drywells without any perforations in the tunnel liner segments.
Figure 17:
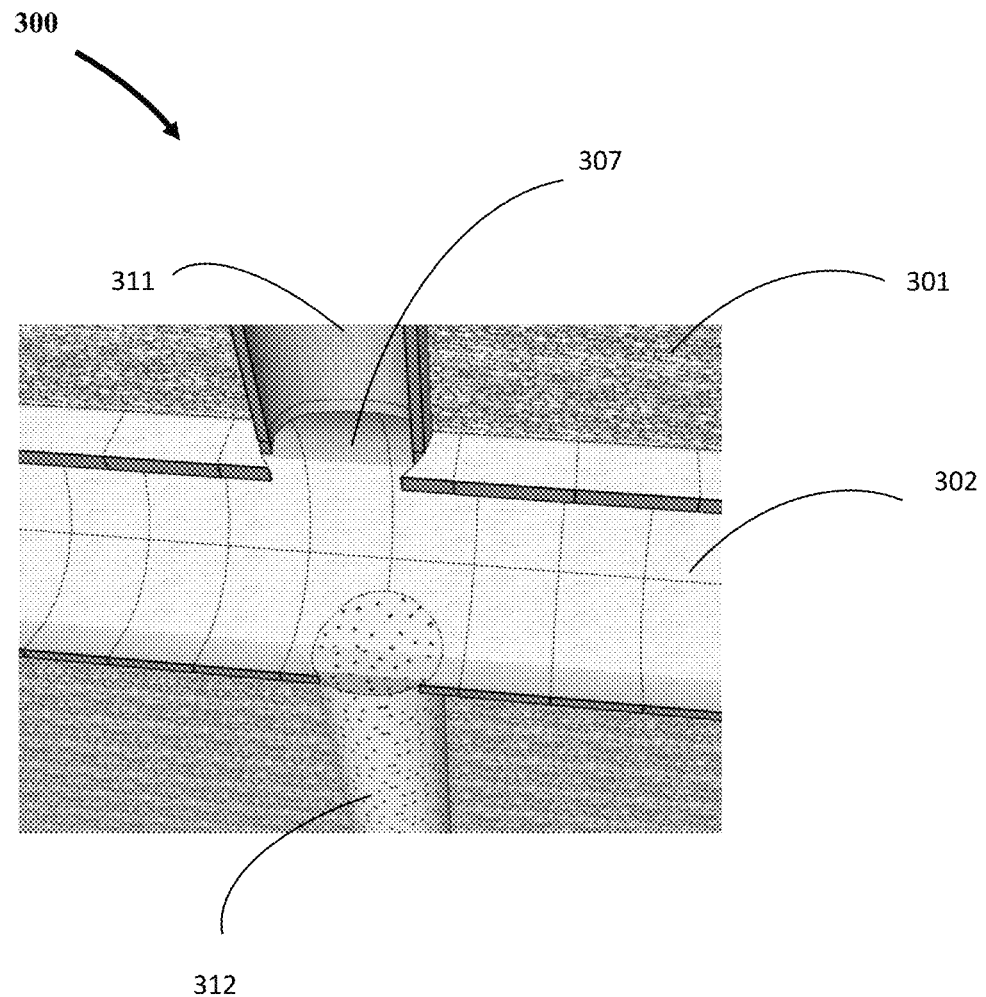
FIG. 17 is a closeup of the tunnel interior of the embodiment of the present invention in FIG. 15 where the drywells are located.
Figure 18:
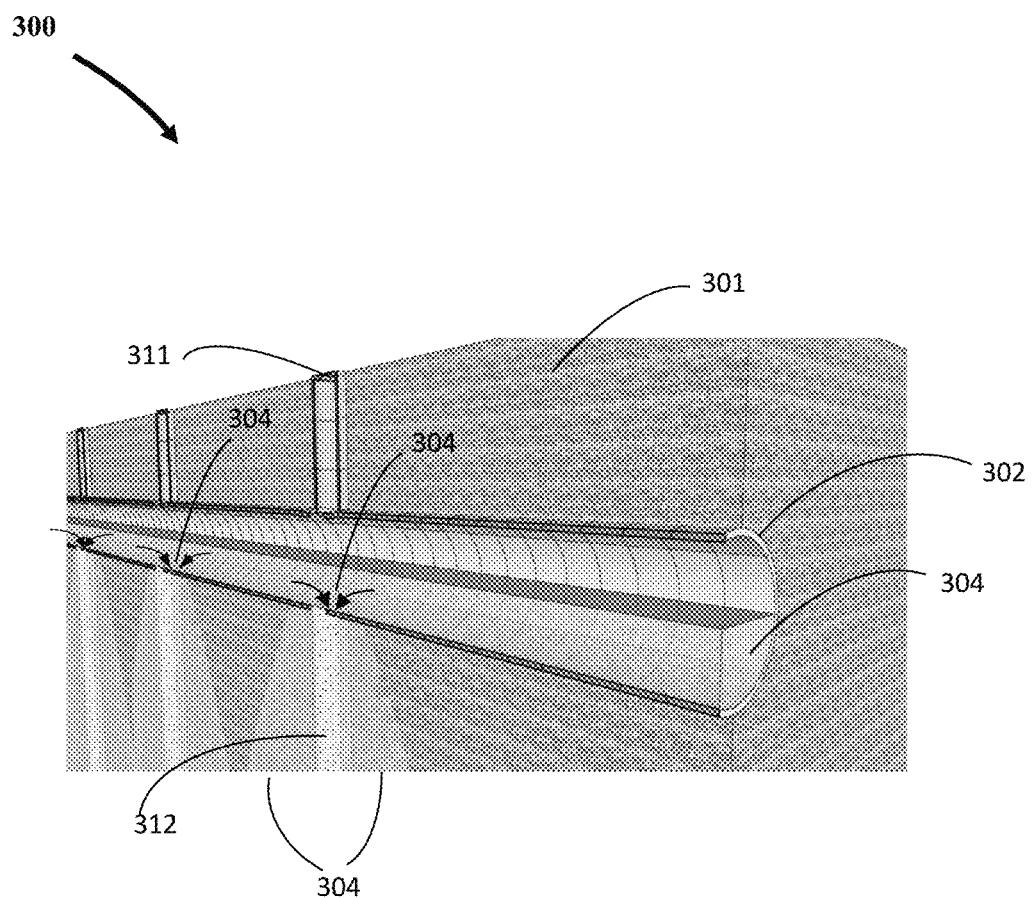
FIG. 18 is a cut longitudinal profile of the embodiment of the present invention in FIG. 15 during operation showing water detention and infiltration.

FIG. 16 is a perspective view of another embodiment of the present invention 300 using drywells 312 and corresponding access shaft 311 without perforations in the tunnel liner segments 302. FIG. 17 is a closeup of the tunnel interior of the embodiment of the present invention 300 in FIG. 16 where the drywells 312 and corresponding access shaft 311 atop opening 307 in tunnel soffit are located. FIG. 18 is a cut longitudinal section of the embodiment of the present invention in 300 FIG. 16 during operation showing water detention and infiltration. Diverted stormwater 304 infiltrates to ground formation 301 through infiltration dry wells 312. Water 304 accumulates inside tunnel 300 during the times when inflow from diversion exceed outflow by infiltration and dissipate once inflow from diversion is less that outflow by infiltration.

Figure 19:
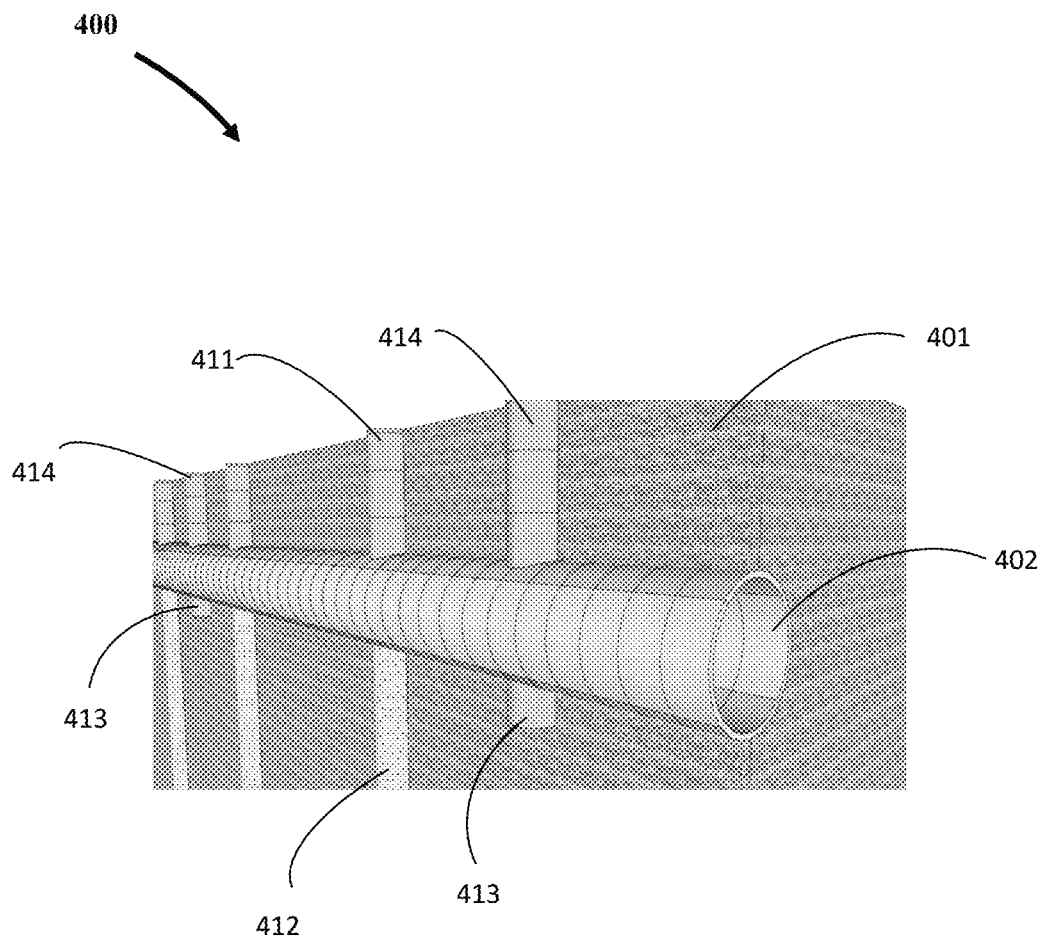
FIG. 19 is a perspective view of another embodiment of the present invention for water retention in addition to detention and infiltration utilizing drywells and sumps.
Figure 20:
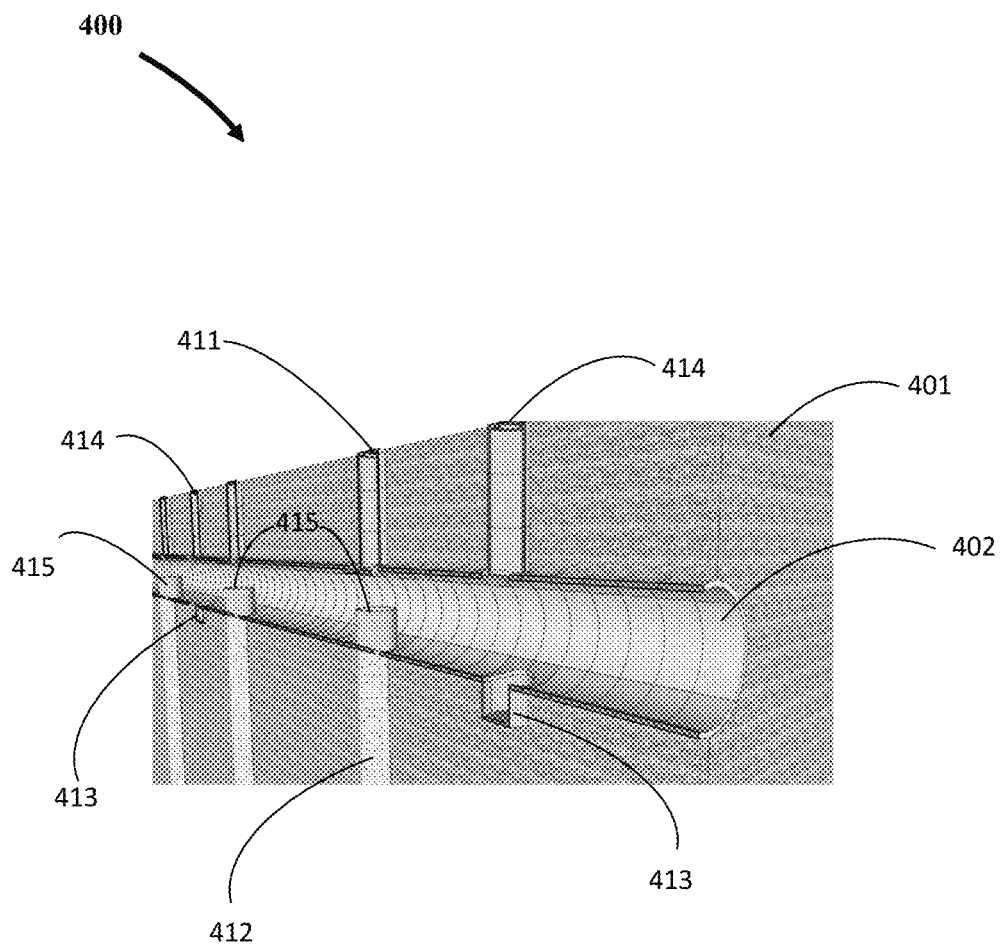
FIG. 20 is a cut longitudinal section of the embodiment of the present invention in FIG. 18 showing the drywell risers and sumps.

FIG. 19 is a perspective view of another embodiment of the present invention 400 for water retention in addition to detention and infiltration. This embodiment incorporates infiltration drywells 412 with their inlet elevated about invert of the tunnel 400 (not shown). In addition, the tunnel 400 is fitted with sumps 413 with access shafts 414 that accommodate sump pumps (not shown) for removal of detained water and any deposited sediment. FIG. 20 is a cut longitudinal section of the embodiment of the present invention 400 in FIG. 19 showing risers 415 fitted to the drywells 412 to enable retention of water up to the inlet elevation of the risers 415 in the tunnel. Also shown are sumps 413, positioned at intervals along tunnel to enable removal of detained water and any deposited sediment by sump pumps (not shown).

Figure 21:
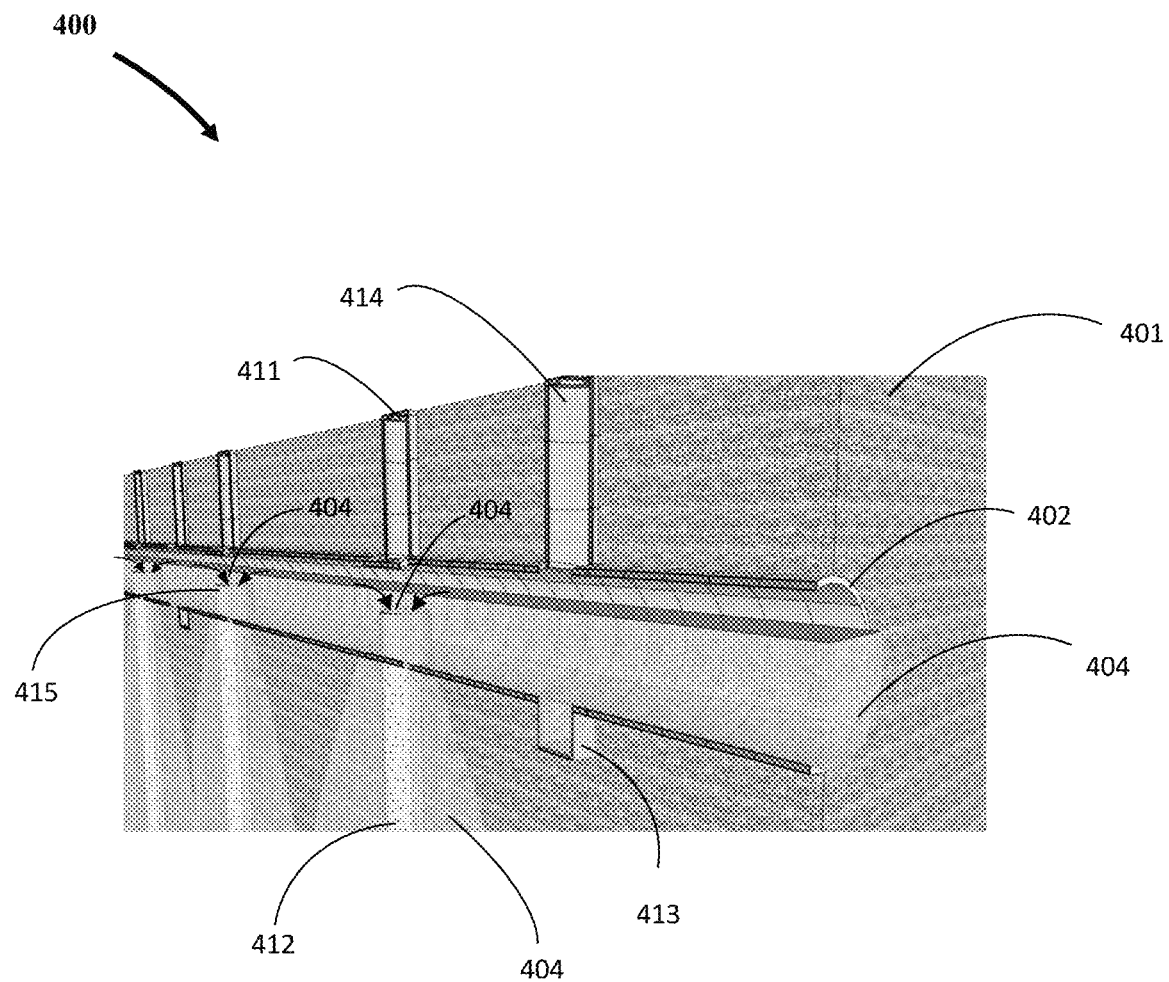
FIG. 21 is a cut longitudinal section of the embodiment of the present invention in FIG. 18 during operation showing water detention and infiltration.
Figure 22:
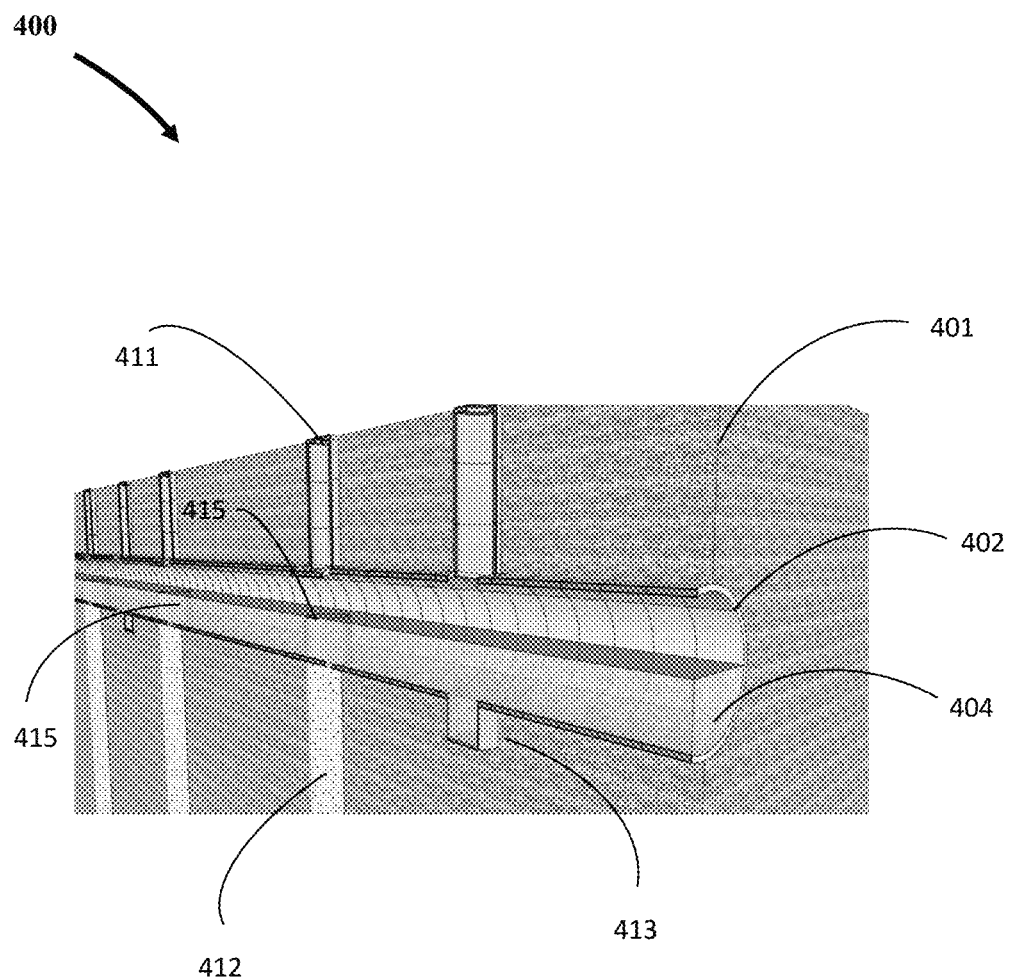
FIG. 22 is a cut longitudinal section of the embodiment of the present invention in FIG. 18 after the storm event showing water retention.

FIG. 21 is a cut longitudinal section of the embodiment of the present invention 400 in FIG. 19 during operation showing water detention and infiltration. The volume of diverted stormwater runoff 404 is larger than the water retention capacity of the tunnel 400 corresponding to sill level of risers 415 resulting in water submerging the risers 415 and flowing into drywells 412 infiltrating into ground formation 401. FIG. 22 is a cut longitudinal section of the embodiment of the present invention 400 in FIG. 19 after the storm event showing water 404 retained in the tunnel 400. All water 404 above sill level of risers 415 has infiltrated into ground formation 401 via dry wells 412, while there remains water 404 below sill level of riser 415 as the tunnel 400 is watertight to retain water 404 for later use. Sumps 413 are low points in the tunnel 400 to be accessed via encased shafts 414 for fitting of sump pumps (not shown) to remove the retained water 404 and any deposited silt (not shown) from the tunnel 400.

Figure 23:
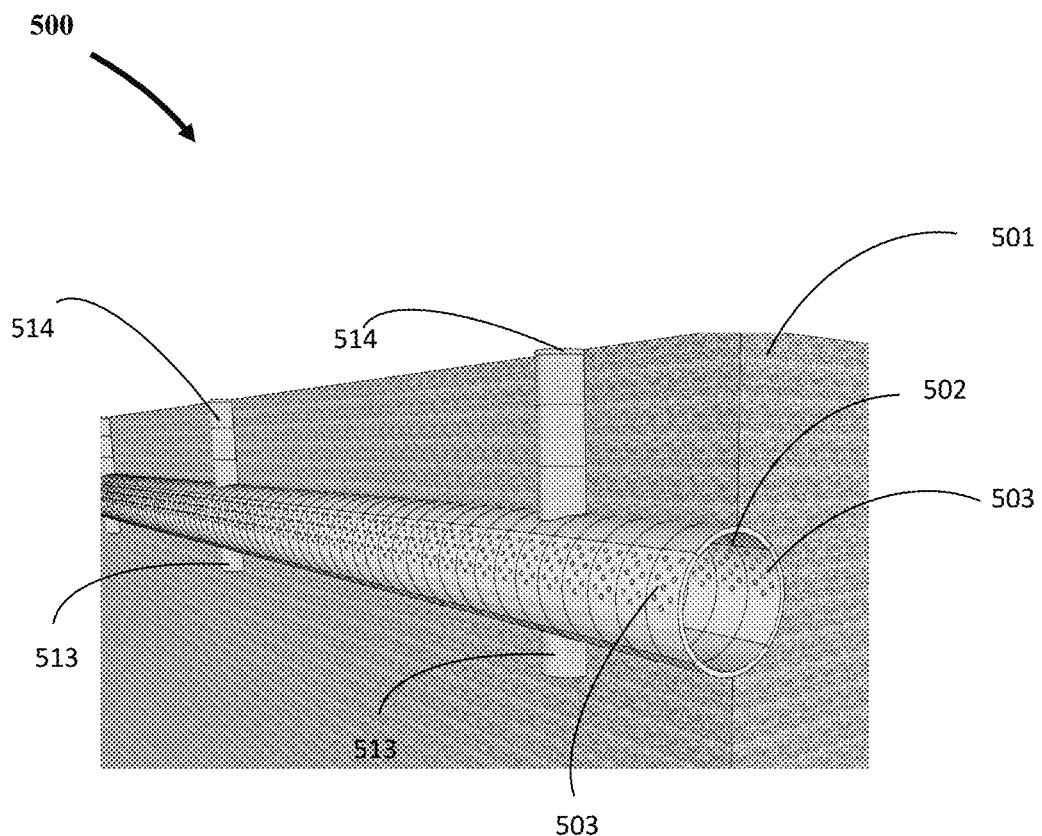
FIG. 23 is a perspective view of another embodiment of the present invention for water retention in addition to detention and infiltration utilizing elevated perforations.
Figure 24:
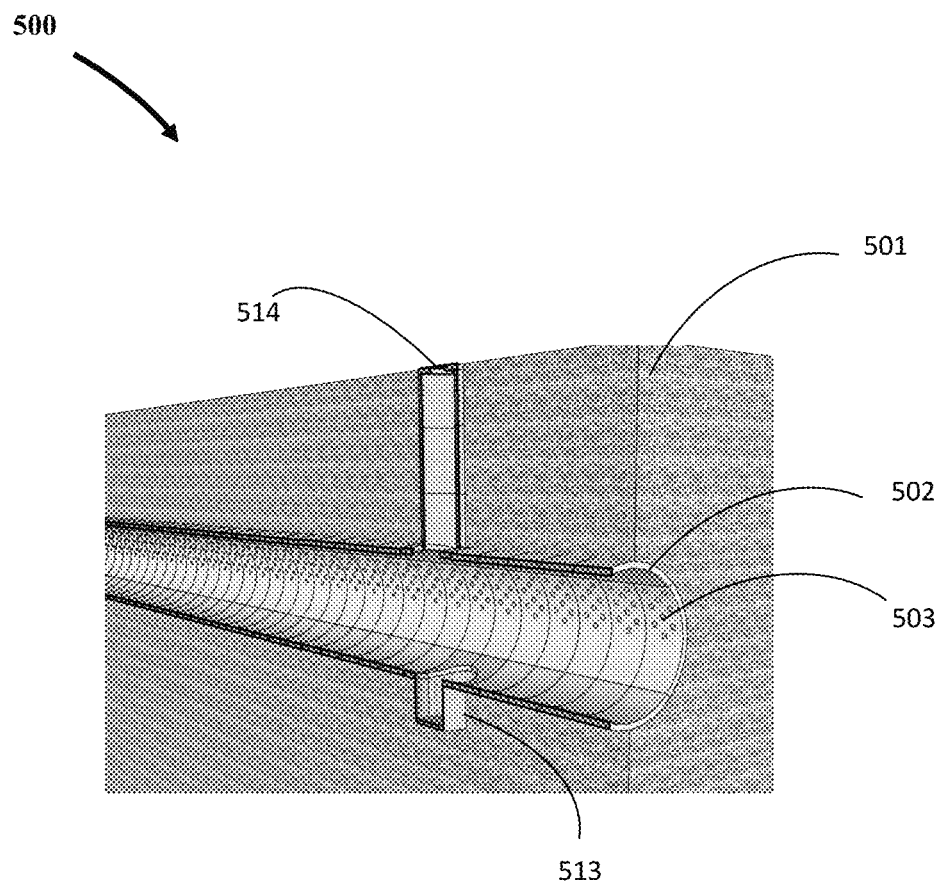
FIG. 24 is a cut longitudinal section of the embodiment of the present invention in FIG. 23 showing the elevated perforation and sumps.

FIG. 23 is a perspective view of another embodiment of the present invention 500 for water retention in addition to detention and infiltration utilizing elevated perforations. Liner 502 includes perforated segments 503 with perforations only down to a certain level above tunnel invert to arrest infiltration and retain water below that level. Tunnel 500 is also fitted with sumps 513 for pumping of water and any silt deposits out of tunnel 500, accessible through shafts 514. FIG. 24 is a cut longitudinal section of the embodiment of the present invention 500 in FIG. 23 showing elevated perforations above invert that enable retention of water up to the lowest perforations of perforated segments 503 in the tunnel 500. Also shown is sumps 513 to enable removal of detained water and any deposited silt by sump pumps (not shown).

Figure 25:
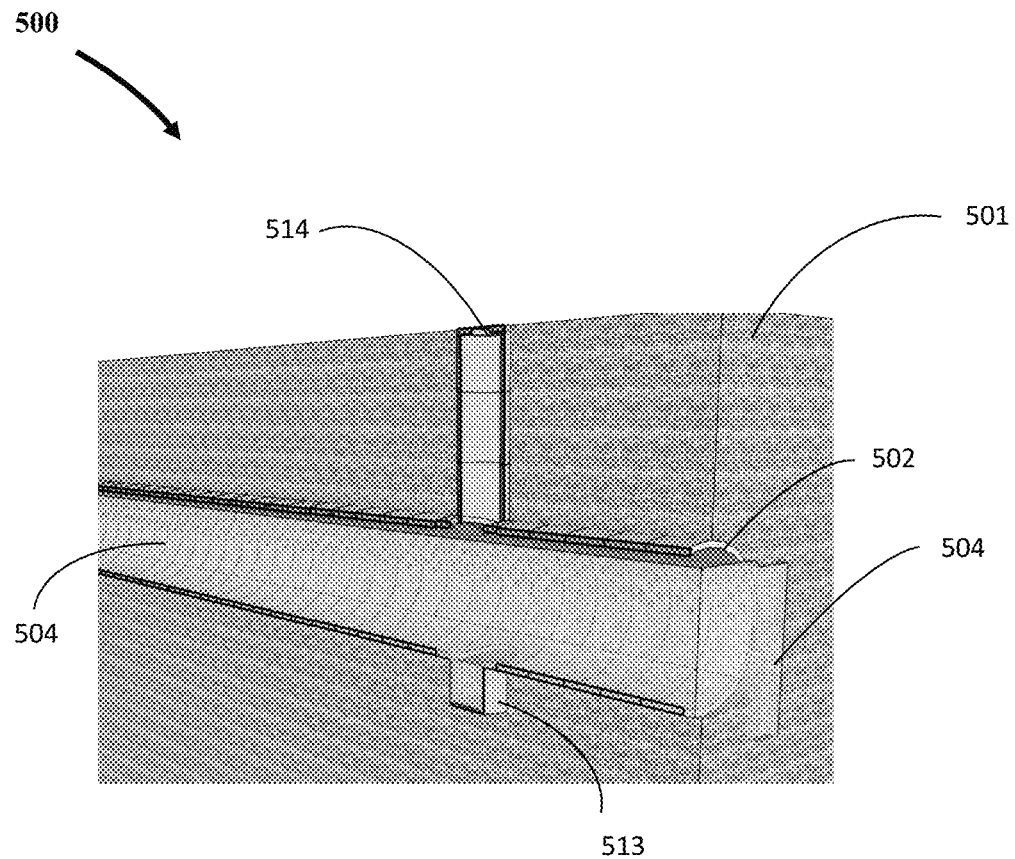
FIG. 25 is a cut longitudinal section of the embodiment of the present invention in FIG. 23 during operation showing water detention and infiltration.
Figure 26:
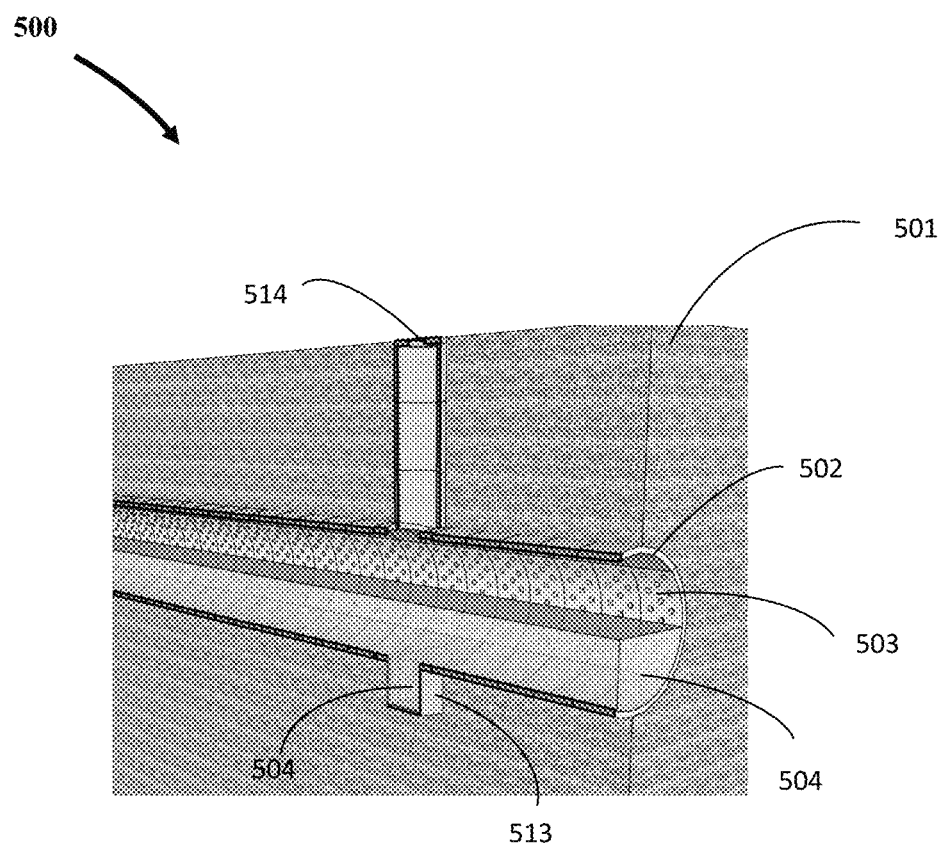
FIG. 26 is a cut longitudinal section of the embodiment of the present invention in FIG. 23 after the storm event showing water retention.

FIG. 25 is a cut longitudinal section of the embodiment of the present invention 500 in FIG. 23 during operation showing water detention and infiltration. The volume of diverted stormwater runoff 504 is larger than the water retention capacity of the tunnel 500 corresponding to lowest perforations of perforated segments 503 resulting in water 504 submerging the perforated segments 503 and flowing into ground formation 501. FIG. 26 is a cut longitudinal section of the embodiment of the present invention 500 in FIG. 23 after the storm event showing water 504 retained in the tunnel 500. All water 504 lowest perforations of perforated segments 503 has infiltrated into ground formation 501, while there remains water 504 below lowest perforations of perforated segments 503 as the tunnel 500 is watertight to retain water 504 for later use. Sumps 513 are low points in the tunnel 500 to be accessed via encased shafts 514 for fitting of sump pumps (not shown) to remove the retained water 504 and any deposited silt (not shown) from the tunnel 500.

Figure 27:
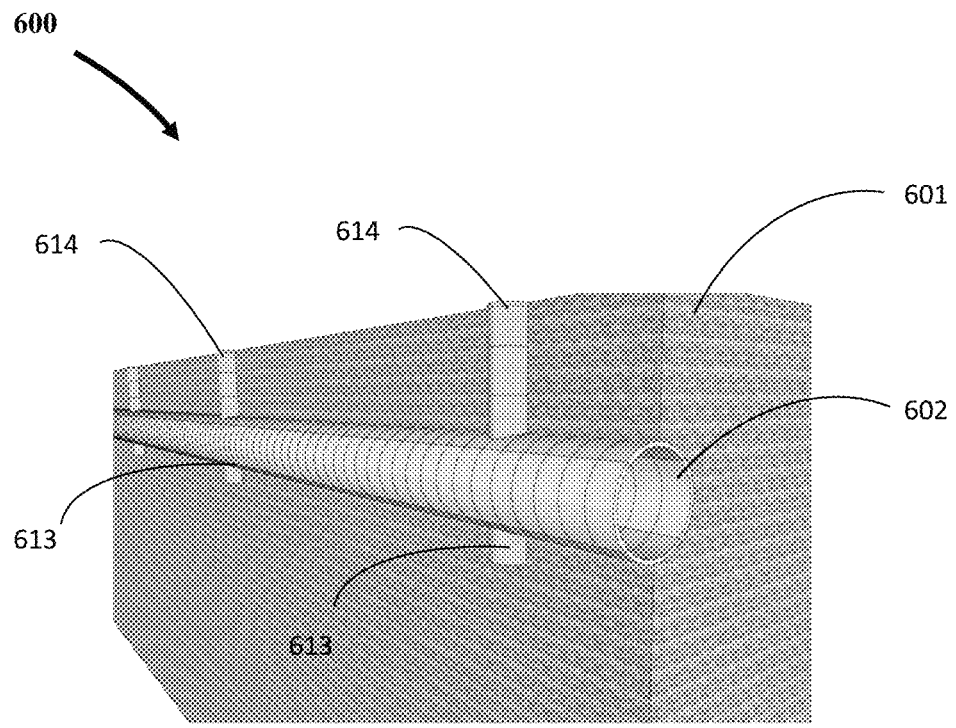
FIG. 27 is a perspective view of another embodiment of the present invention for water retention only.
Figure 28:
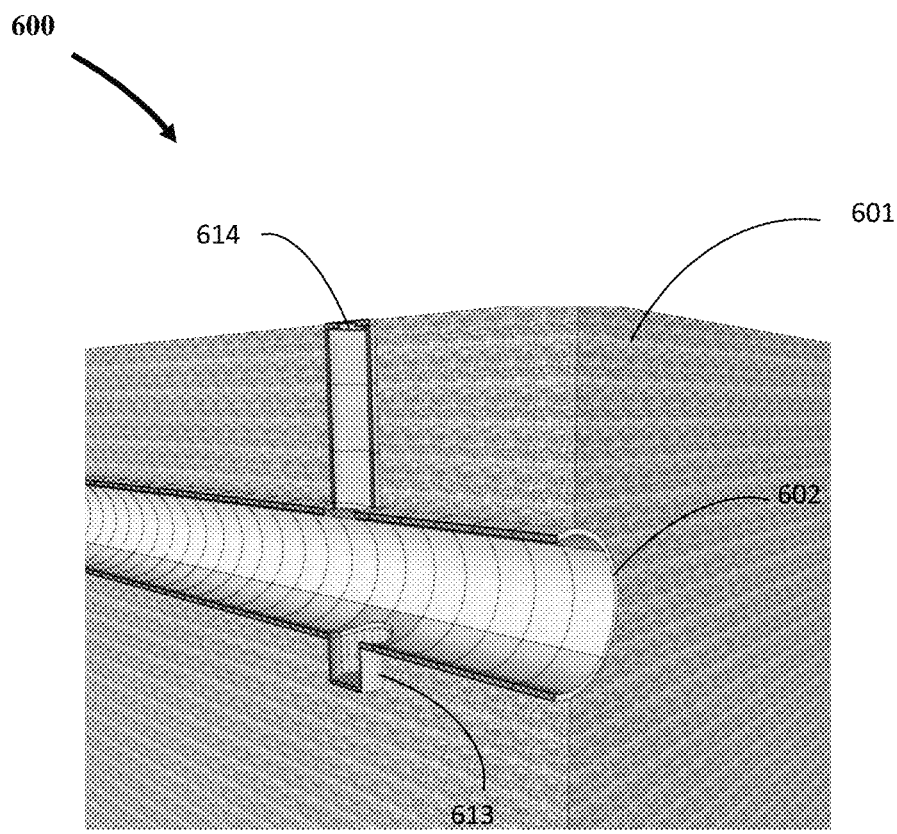
FIG. 28 is a cut longitudinal section of the embodiment of the present invention in FIG. 27 showing the sumps.

FIG. 27 is a perspective view of another embodiment of the present invention 600 for water retention only. Liner 602 is watertight intended to maintain the water within. Tunnel 600 is fitted with sumps 613 for pumping of water and any silt deposits out of tunnel 600, accessible through shafts 614. FIG. 28 is a cut longitudinal section of the embodiment of the present invention 600 in FIG. 27 showing sumps 613 to enable removal of detained water and any deposited silt by sump pumps (not shown).

Figure 29:
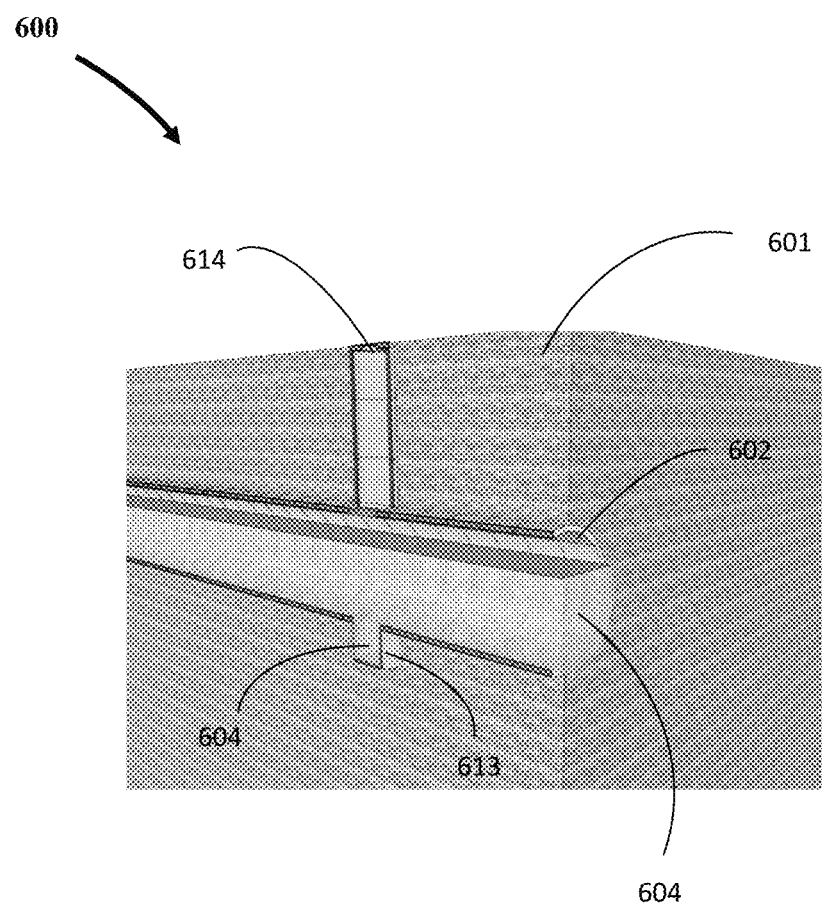
FIG. 29 is a cut longitudinal section of the embodiment of the present invention in FIG. 27 during operation showing water retention.
Figure 30:
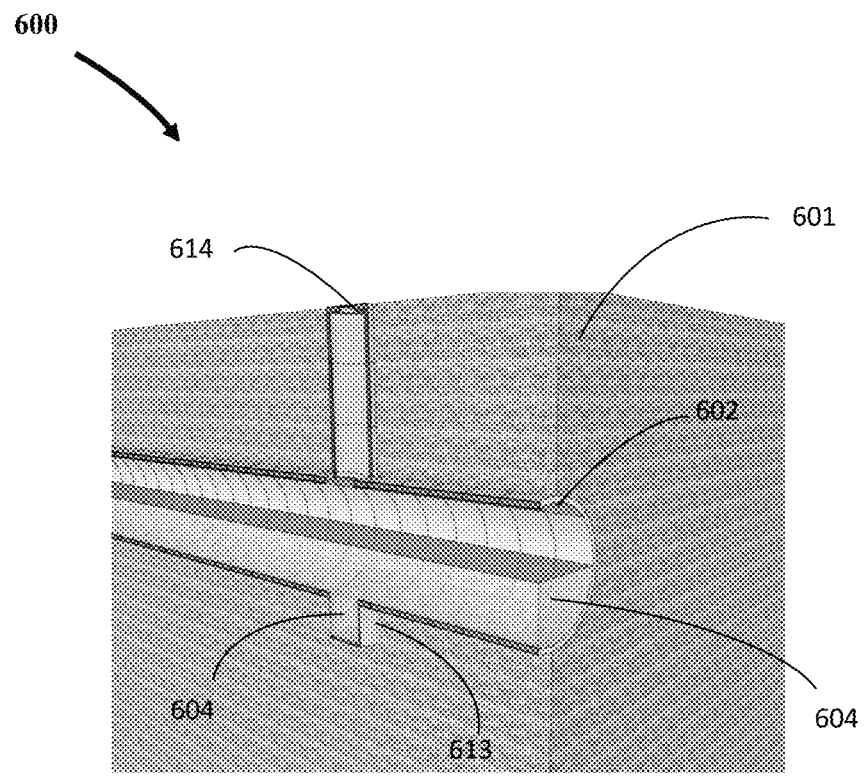
FIG. 30 is a cut longitudinal section of the embodiment of the present invention in FIG. 27 after pumping out of some of the retained water.

FIG. 29 is a cut longitudinal section of the embodiment of the present invention 600 in FIG. 27 during operation showing water detention. Diverted stormwater runoff 604 is retained in tunnel 600 for later pumping. FIG. 30 is a cut longitudinal section of the embodiment of the present invention 600 in FIG. 27 after the after the pumping out of some of the water 604 retained in the tunnel 600. Sumps 613 are low points in tunnel 600 to be accessed via encased shafts 614 for fitting of sump pumps (not shown) to remove the retained water 604 and any deposited silt (not shown) from the tunnel 600.

The present invention is susceptible to modifications and variations which may be introduced thereto without departing from the inventive concepts and the object of the invention. These may include cross section forms of tunnel and shafts other that circular and indirect connection of infiltration drywells to the tunnel such as via lateral conduits. The inlet to the drywells may be fitted with filtration devices to prevent silt and other contaminants from entering the drywells.

While the present invention has been described in connection with stormwater runoff, it is to be understood that the present invention is intended to cover various other utilities which are included within the spirit and scope of the disclosures. These may include diversion for infiltration, detention, and retention of water from perennial streams, water flow in streams and channels resulting from snowmelt, and to relieve floodwaters in streets and public areas. The present invention may also be utilized in reverse for groundwater to percolate from the ground formation into the tunnel via perforation for drainage of waterlogged ground formations. Similarly, the drywells of the present invention may be utilized to tap into artesian groundwater formations below and convey water under artesian pressure from such formation into the tunnel of the present invention for retention and use.

While the present invention has been described in connection with what is considered the most practical and preferred embodiments, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A tunnel for detention and infiltration of water, the tunnel comprising: a substantially level longitudinal void space belowground mechanically excavated and lined with structural liner segments disposed to provide certain volume for accumulation of water, portions of said liner segments having been fitted with perforations disposed to establish hydraulic communication between interior of said tunnel and exterior ground formations thereby providing certain capacity for infiltration of said water into ground, said perforations covering the invert of said tunnel to ensure complete emptying of said tunnel via infiltration, at least one vertical shaft filled with granular material extending below invert of said tunnel and in hydraulic communication with the invert of said tunnel via an inlet, said vertical shaft disposed to provide said tunnel with additional capacity for infiltration and complete emptying of said tunnel via infiltration of said water into ground.

2. A tunnel for detention, infiltration and retention of water, the tunnel comprising: a substantially level longitudinal void space belowground mechanically excavated and lined with structural liner segments disposed to provide certain volume for accumulation of water, portions of said liner segments having been fitted with perforations disposed to establish hydraulic communication between interior of said tunnel and exterior ground formations thereby providing certain capacity for infiltration of said water into ground, said perforations existing only at certain level above invert of said tunnel to prevent complete emptying of said tunnel vial infiltration thus retaining certain volume of water within, at least one vertical shaft filled with granular material extending below invert of said tunnel and in hydraulic communication with the invert of said tunnel via an inlet, said vertical shaft disposed to provide said tunnel with additional capacity for infiltration of said water into ground, said inlet of said vertical shaft having been set a certain level above the invert of said tunnel to prevent complete emptying of said tunnel via infiltration and thus retaining a certain volume of water within, at least one low point disposed to facilitate the hydromechanical removal of the majority of said stormwater retained.

3. Tunnel of claim 1, wherein the inlets of said vertical shafts is fitted with filters disposed to screen silt and other contaminants from entering said vertical shaft.

4. Tunnel of claim 2, wherein the inlets of said vertical shafts is fitted with filters disposed to screen silt and other contaminants from entering said vertical shaft.

* * * * *